(12) United States Patent
Janniello

(10) Patent No.: US 11,042,741 B2
(45) Date of Patent: *Jun. 22, 2021

(54) INTELLIGENT PROTECTIVE DRONE

(71) Applicant: James P Janniello, Sarasota, FL (US)

(72) Inventor: James P Janniello, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/996,315

(22) Filed: Aug. 18, 2020

(65) Prior Publication Data

US 2020/0380241 A1 Dec. 3, 2020

Related U.S. Application Data

(63) Continuation of application No. 15/873,489, filed on Jan. 17, 2018, now Pat. No. 10,747,997.

(60) Provisional application No. 62/499,154, filed on Jan. 17, 2017.

(51) Int. Cl.
```
G06K 9/00      (2006.01)
B64C 39/02     (2006.01)
B64D 47/08     (2006.01)
G08G 5/00      (2006.01)
```
(52) U.S. Cl.
CPC .......... *G06K 9/0063* (2013.01); *B64C 39/024* (2013.01); *B64D 47/08* (2013.01); *G08G 5/0069* (2013.01); *B64C 2201/127* (2013.01); *G06T 2207/10032* (2013.01)

(58) Field of Classification Search
CPC .......... A61B 2560/0233; A61B 5/0024; G08G 5/0069; H04M 2250/12; H01L 23/552; B64C 39/024; B64C 2201/127; B64C 2201/12; B64C 2201/123; B64C 2201/146; B64C 2201/027; B64C 2201/128; B64C 2201/203; B64C 27/006; B64D 47/08; G06K 9/0063; G06T 2207/10032; G05D 1/0088; H04N 7/185
See application file for complete search history.

(56) References Cited

U.S. PATENT DOCUMENTS

| 10,747,997 B2* | 8/2020 | Janniello ............... B64D 47/08 |
| 2012/0242501 A1* | 9/2012 | Tran .................... A61B 5/7465 340/870.02 |
| 2019/0220648 A1* | 7/2019 | Janniello ............... B64D 47/08 |

OTHER PUBLICATIONS

Motlagh et al., Low-Altitude Unmanned Aerial Vehicles-Based Internet of Things Services: Comprehensive Survey and Future Perspectives, 2016, IEEE, p. 899-922 (Year: 2016).*
Borky, Payload technologies and applications for uninhabited air vehicles (UAVs), 1997, IEEE, p. 267-283 (Year: 1997).*
Yapp et al., UAV as a service: Enabling on-demand access and on-the-fly re-tasking of multi-tenant UAVs using cloud services, 2016, IEEE, p. 1-8 (Year: 2016).*

* cited by examiner

*Primary Examiner* — McDieunel Marc

(57) ABSTRACT

Methods, systems, and apparatus for an intelligent protective drone are described. The aeronautical drone comprises an environmental protective shield that provides protection from environmental elements. An image of an environment near the aeronautical drone is captured and processed to identify a target entity. A geographic location of an effective protective area provided by the environmental protective shield is identified and a location for the aeronautical drone is determined that places the target entity within the effective protective area.

20 Claims, 7 Drawing Sheets

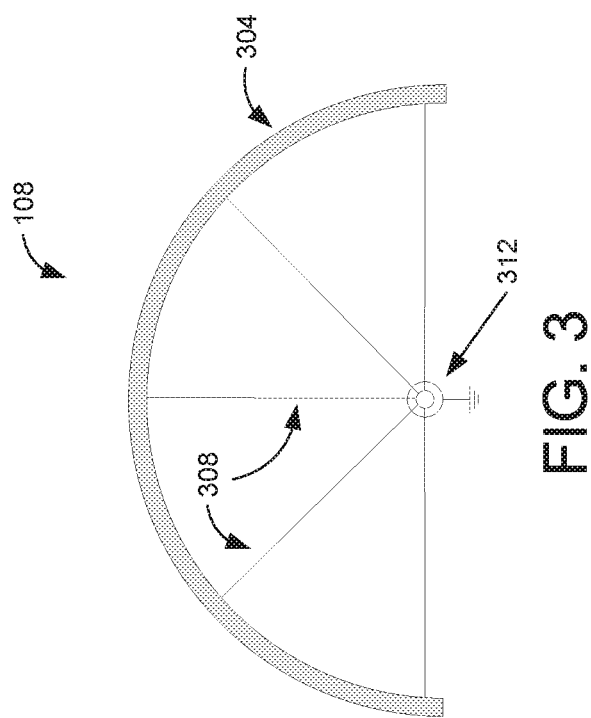
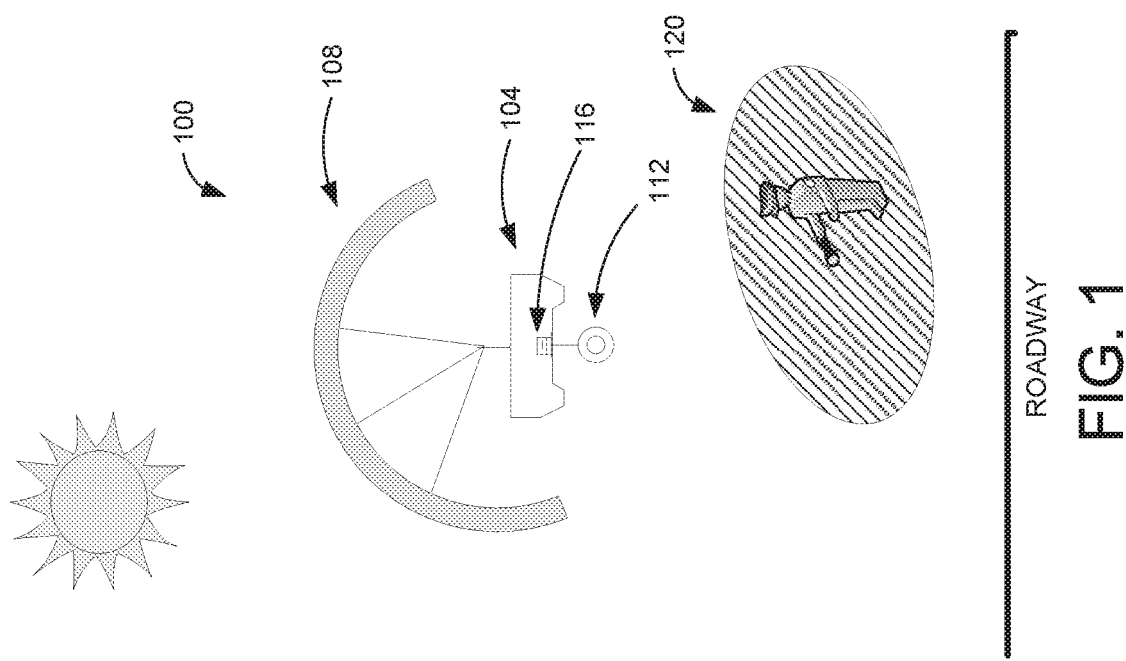

INTELLIGENT PROTECTIVE DRONE

CLAIM OF PRIORITY

This application claims the benefit of priority under 35 U.S.C. § 119(e) of U.S. patent application Ser. No. 15/873,489, filed on Jan. 17, 2017, which is incorporated by reference herein in their entirety.

TECHNICAL FIELD

The present application relates generally to providing protection from environmental elements and conditions, and more specifically, in one example, to an intelligent drone for providing protection from environmental elements and conditions.

BACKGROUND

Pedestrians, sports players, construction workers, and the like are often subjected to a variety of environmental conditions that make their tasks difficult to perform. Golfers, for example, may find it difficult to swing a golf club in the rain, yet may have no hand free for holding an umbrella. Shoppers carrying packages may similarly have no free hand to carry an umbrella. Construction workers paving a road may find that the effects of heat from the sun may slow production, but may find it unproductive to carry an umbrella. Similarly, while umbrellas may be attached to many types of equipment, they may not be easily adjusted to provide protection from changing environmental conditions, such as a changing direction of sunshine or rainfall. Thus, while umbrellas may be useful in certain circumstances, they are often difficult to use in conjunction with many tasks.

BRIEF DESCRIPTION OF THE DRAWINGS

Some embodiments are illustrated by way of example and not limitation in the figures of the accompanying drawings, in which:

FIG. 1 is a block diagram of an example intelligent protective drone system, in accordance with an example embodiment;

FIG. 3 is a diagram of an example environmental protective shield for an aeronautical drone, in accordance with an example embodiment;

DETAILED DESCRIPTION

Figure 2:
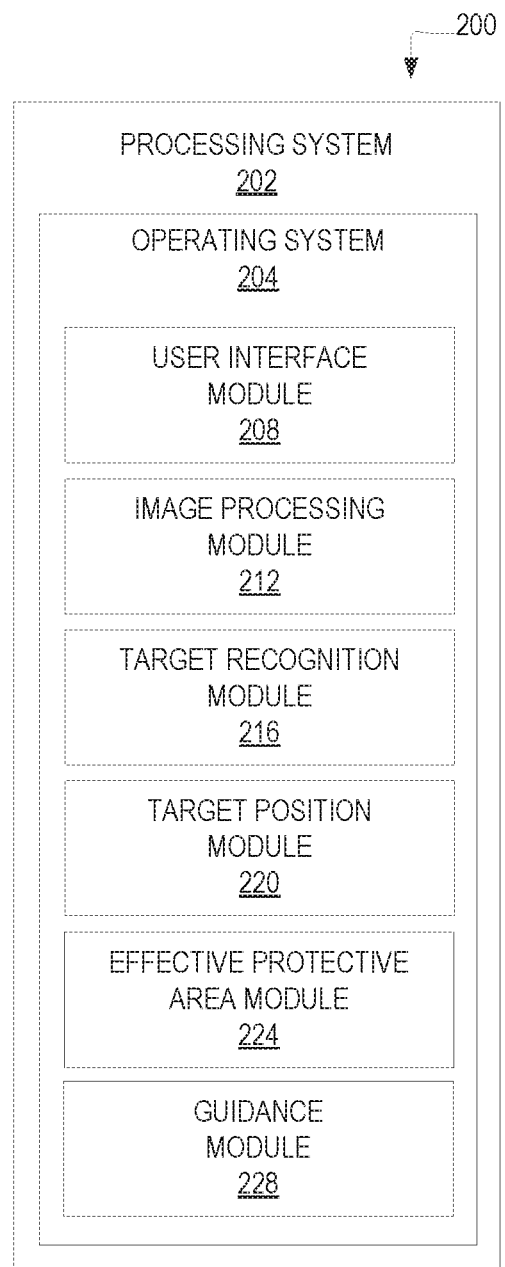
FIG. 2 is a block diagram of an example apparatus for controlling an aeronautical drone, in accordance with an example embodiment.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other example embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, apparatus, and systems for providing protection from environmental elements and conditions (known collectively as "environmental elements" herein) are disclosed. In one example embodiment, an aeronautical drone is configured to act as a protective shield that provides protection against the environmental elements for a particular geographical area (known as an "effective protective area" herein). The drone is also configured to track and follow an individual (a human being), an object, a piece of equipment, or any combination thereof (known as a "target entity" herein) and thereby protect the target entity from the environmental elements. The protective shield may be effective in providing protection from rain, snow, wind, the rays of the sun, and the like.

The drone may use one or more techniques to perform the tracking and following operations. For example, a camera mounted on the drone may be used to track the target entity. For example, the drone may be trained to recognize a particular object in an image (such as a golf club or tractor), a person or an element (such as a particular clothing material or facial feature) associated with the person, a graphical symbol or image attached to an individual or an object, and the like (known collectively as a target feature herein). The drone may track the target entity in a live image that is captured by the camera system.

The drone may be positioned in an area surrounding the target entity, including directly above the target entity. The drone may be positioned in the path of the sun's rays such that the target entity resides fully or partially in the shade created by the drone's protective shield. Similarly, if rain is falling in the wind, the drone may be positioned such that the target entity is fully or partially residing in the dry (or relatively dry) area created by the protective shield. For example, if the sun is directly overhead of the target entity or rain is falling in an environment with no wind, the drone may be positioned directly above the target entity.

In one example embodiment, the drone is manually controlled by a user to initially position the drone directly above or near the target entity. Once the drone identifies and locks onto the target entity, the drone assumes control of its location and maintains an appropriate position and distance in relation to the target entity, as described more fully below by way of example.

FIG. 1 is a block diagram of an example intelligent protective drone system 100, in accordance with an example embodiment. In one example embodiment, the intelligent protective drone system 100 may comprise an aeronautical drone 104, an environmental protective shield 108, a camera system 112, and a tracking and guidance module 116.

The aeronautical drone 104 is a drone whose location may be controlled in relation to a target entity, such as an object or an individual. The location may be specified by an altitude or height above the target entity, a geographical location, and the like. The geographical location may be defined by latitude and longitude coordinates, a position relative to the target entity (such as 15 feet northeast of the target entity and twelve feet above the target entity), Global Positioning System (GPS) coordinates, and the like. In one example embodiment, the location of the aeronautical drone 104 is controlled by dynamically and incrementally adjusting the location of the aeronautical drone 104 based on, for example, an image captured by the camera system 112 in order to position the effective protective area around the target entity.

The location may also be adjusted to create an effective protective area 120 of a specified size and location. The size and location may be achieved using the dynamic and incremental technique described above. The effective protective area 120 may be, for example, the area of shade cast by the environmental protective shield 108 and may be positioned to surround the target entity. The size of the shadow created by the environmental protective shield 108 may be increased by increasing the altitude of the aeronautical drone 104 and may be decreased by decreasing the altitude of the aeronautical drone 104.

The environmental protective shield 108 provides protection for the target entity from environmental elements, such as the rays of the sun, wind, rain, snow, and the like, as described more fully below by way of example in conjunction with FIG. 3. The environmental protective shield 108 may be rotated, tilted, or both, for example, to change the size, change the location, or both of the effective protective area 120 created by the environmental protective shield 108.

The camera system 112 captures images from the aeronautical drone 104 and provides the images to the tracking and guidance module 116 for processing.

The tracking and guidance module 116 detects the location of the target entity and the effective protective area 120 provided by the environmental protective shield 108. For example, the tracking and guidance module 116 may obtain the GPS coordinates of the target entity from the target entity or another entity (such as a smartphone located near the target entity), may perform image processing on an image of the target entity to detect a target feature or other distinguishing feature of the target entity, may track a radio beacon emitted by the target entity, and the like. Similarly, the tracking and guidance module 116 may perform image processing on an image to detect an area of shade provided by the environmental protective shield 108, a dry area provided by the environmental protective shield 108, and the like.

The tracking and guidance module 116 also analyzes the location of the target entity and the location of the effective protective area 120 of the environmental protective shield 108 and determines the appropriate location for the aeronautical drone 104. For example, a new position and altitude may be determined for the aeronautical drone 104 to position the shadow created by the environmental protective shield 108 around the target entity (such that the target entity is located, for example, within the center of the shadow based on the geographical location of the shadow and the geographical location of the target entity). Similarly, a new position and altitude may be determined for the aeronautical drone 104 to create an effective protective area 120 of the environmental protective shield 108 that is of a specified size. The tracking and guidance module 116 provides instructions to the aeronautical drone 104 to control the position of the aeronautical drone 104 in relation to the target entity. In one example embodiment, the tracking and guidance module 116 provides instructions for tilting and rotating the environmental protective shield 108 in order to create the effective protective area 120 at the appropriate location.

In one example embodiment, the tracking and guidance module 116 instructs the aeronautical drone 104 to move incrementally in small steps (such as horizontal steps of one to three feet or vertical steps of one to three feet) until the target entity is in the center of the effective protective area 120. The position of the target entity in relation to the effective protective area 120 may be evaluated after each move.

The tracking and guidance module 116 may include a processor (e.g., a central processing unit (CPU), a graphics processing unit (GPU), and the like) and a memory, which communicate with each other via a bus. The tracking and guidance module 116 may further include a video display (e.g., a plasma display, a liquid crystal display (LCD), and the like). The tracking and guidance module 116 may also include an alphanumeric input device (e.g., a keyboard), a remote user interface (UI) navigation device (e.g., a mouse and/or touch screen), a drive unit, a signal generation device (e.g., a speaker), and a network interface device.

The drive unit, such as a removable drive unit, includes a machine-readable medium on which is stored one or more sets of instructions and data structures embodying or utilized by any one or more of the methodologies or functions described herein. The instructions may also reside, completely or at least partially, within the memory and/or within the processor during execution thereof by the computer processing system. The instructions may further be transmitted or received over a network via the network interface device utilizing any one of a number of well-known transfer protocols (e.g., Hypertext Transfer Protocol (HTTP)).

The network (not shown) may be a local area network (LAN), a wireless network, a metropolitan area network (MAN), a wide area network (WAN), a network of interconnected networks, the public switched telephone network (PSTN), an electrical power-based network (such as a network using the X10 protocol), and the like. Communication links include, but are not limited to, WiFi (e.g., IEEE 802.11), Bluetooth, Universal Serial Bus (USB), and the like. In one example embodiment, the network may comprise one or more routers and/or device switches.

FIG. 2 is a block diagram of an example apparatus 200 for controlling the aeronautical drone 104, in accordance with an example embodiment. In one example embodiment, the apparatus 200 may serve as the tracking and guidance module 116.

The apparatus 200 is shown to include a processing system 202 that may be implemented on a server, client, or other processing device that includes an operating system 204 for executing software instructions. In accordance with an example embodiment, the processing system 202 may include a user interface module 208, an image processing module 212, a target recognition module 216, a target position module 220, an effective protective area module 224, and a guidance module 228.

The user interface module 208 provides an interface for configuring the intelligent protective drone system 100. For example, a user may view an image captured by the camera system 112 via the user interface module 208 and may position the aeronautical drone 104 above the target entity to allow the tracking and guidance module 116 to lock onto the target entity. A user interface generated by the user interface module 208 and displayed, for example, by the mobile device of FIG. 6 may be used to monitor and control the position of the aeronautical drone 104, as described more fully below by way of example in conjunction with FIG. 5.

The image processing module 212 processes images obtained from the camera system 112 to identify a target entity within the obtained image. A corresponding size and location of the identified target entity may also be determined. The image processing module 212 also identifies the location of the effective protective area 120 within the image, e.g., the location of shade provided by the environmental protective shield 108, the location of dry area provided by the environmental protective shield 108, and the like.

The target recognition module 216 compares the objects and individuals identified in the image to the target entity to identify the target entity in the image. The target recognition module 216 may also determine the relative geographical location of the target entity in relation to the aeronautical drone 104 or a geographical landmark, such as a street corner. In one example embodiment, GPS coordinates of the target entity may be received from the target entity.

The effective protective area module 224 determines the relative geographical location of the effective protective area 120 provided by the environmental protective shield 108, e.g., the dry area provided by the environmental protective shield 108 and the like. The geographical location of the effective protective area 120 may be determined in relation to the target entity.

The target position module 220 determines a new position and altitude for the aeronautical drone 104 based on the location of the effective protective area 120 and the location of the target entity. The guidance module 228 issues instructions to move the aeronautical drone 104 to the new position and altitude. In one example embodiment, the location of the aeronautical drone 104 is controlled by dynamically and incrementally adjusting the location of the aeronautical drone 104 based on an image captured by the camera system 112 in order to position the effective protective area 120 around the target entity.

FIG. 3 is a diagram of an example environmental protective shield 108 for the aeronautical drone 104, in accordance with an example embodiment. The environmental protective shield 108 may be manufactured from a lightweight material 304, such as vinyl, Tyvek®, and the like. A supporting structure 308, such as an inflatable ring, metal or plastic spokes, and the like, may be designed to conform the lightweight material 304 to a particular shape, such as that of a conventional umbrella. An adjustable pivot lever 312 or similar mechanism may be used to rotate the supporting structure 308 to a specified direction and to tilt the supporting structure 308 at a specified angle, as illustrated in FIG. 1.

Figure 4A:
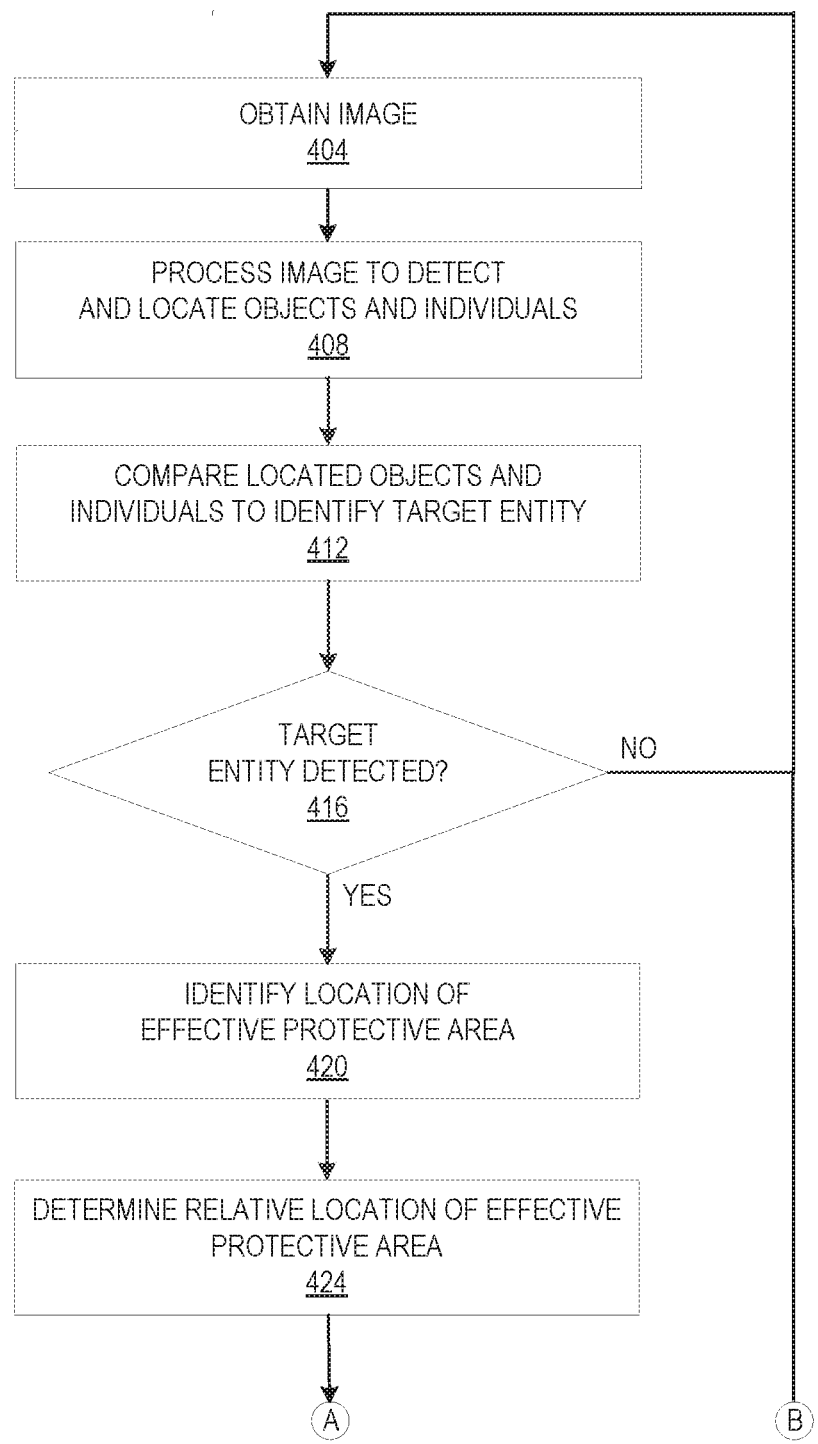
FIGS. 4A and 4B are a flowchart for an example method for controlling an intelligent protective drone system, in accordance with an example embodiment.
Figure 4B:
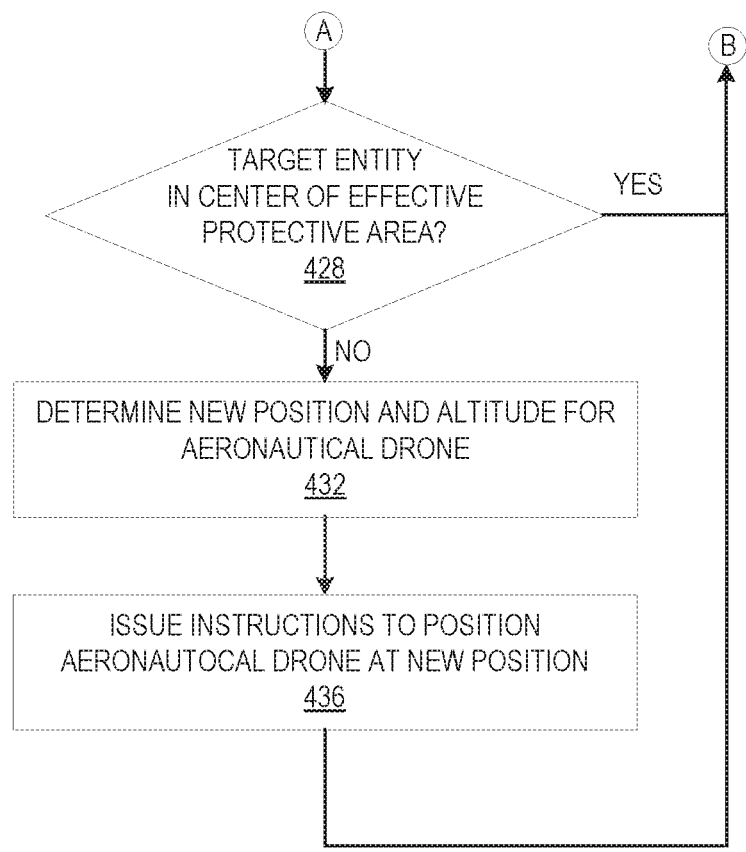

FIGS. 4A and 4B are a flowchart for an example method 400 for controlling the intelligent protective drone system 100, in accordance with an example embodiment.

In one example embodiment, an image from the camera system 112 is obtained (operation 404). The image is processed by the image processing module 212 to detect and locate the objects and individuals, including the target entity, in the image (operation 408). A corresponding size and location of the objects and individuals may also be determined.

The target recognition module 216 compares the identified objects and individuals to the target entity to determine if the target entity has been located. The target recognition module 216 also determines the relative geographical location of the target entity by, for example, analyzing the size and location of the target feature in the image (operation 412).

A test is performed to determine if the target entity has been detected (operation 416). If the target entity has not been detected, the method 400 repeats operation 404; otherwise, the image processing module 212 identifies the location of the effective protective area 120 provided by the environmental protective shield 108 within the image, e.g., the location of shade provided by the environmental protective shield 108, the location of dry area provided by the environmental protective shield 108, and the like (operation 420). For example, changes in brightness, contrast, and the like may be used to locate a shadow created by the environmental protective shield 108.

The effective protective area module 224 determines the relative geographical location of the effective protective area 120 provided by the environmental protective shield 108 in relation to the target entity (operation 424). For example, the location of the effective protective area 120 of the environmental protective shield 108 within the image can be compared with the location of the target entity in the image.

A test is performed to determine if the target entity is located within, for example, the center of the shadow created by the environmental protective shield 108 (operation 428). If the target entity is located within the center of the shadow created by the environmental protective shield 108, the method 400 proceeds to operation 404 to process another image; otherwise, the target position module 220 determines a new position and altitude for the aeronautical drone 104, a new direction and angle for the environmental protective shield 108, or both in order to position the effective protective area 120 created by the environmental protective shield 108 such that the target entity is located within the center of the shadow (based on the geographical location of, for example, the shadow and the geographical location of the target entity) (operation 432). The guidance module 228 issues instructions to move the aeronautical drone 104, the environmental protective shield 108, or both to the new configuration of the aeronautical drone 104, the environmental protective shield 108, or both (operation 436), and the method 400 proceeds with operation 404.

Figure 5:
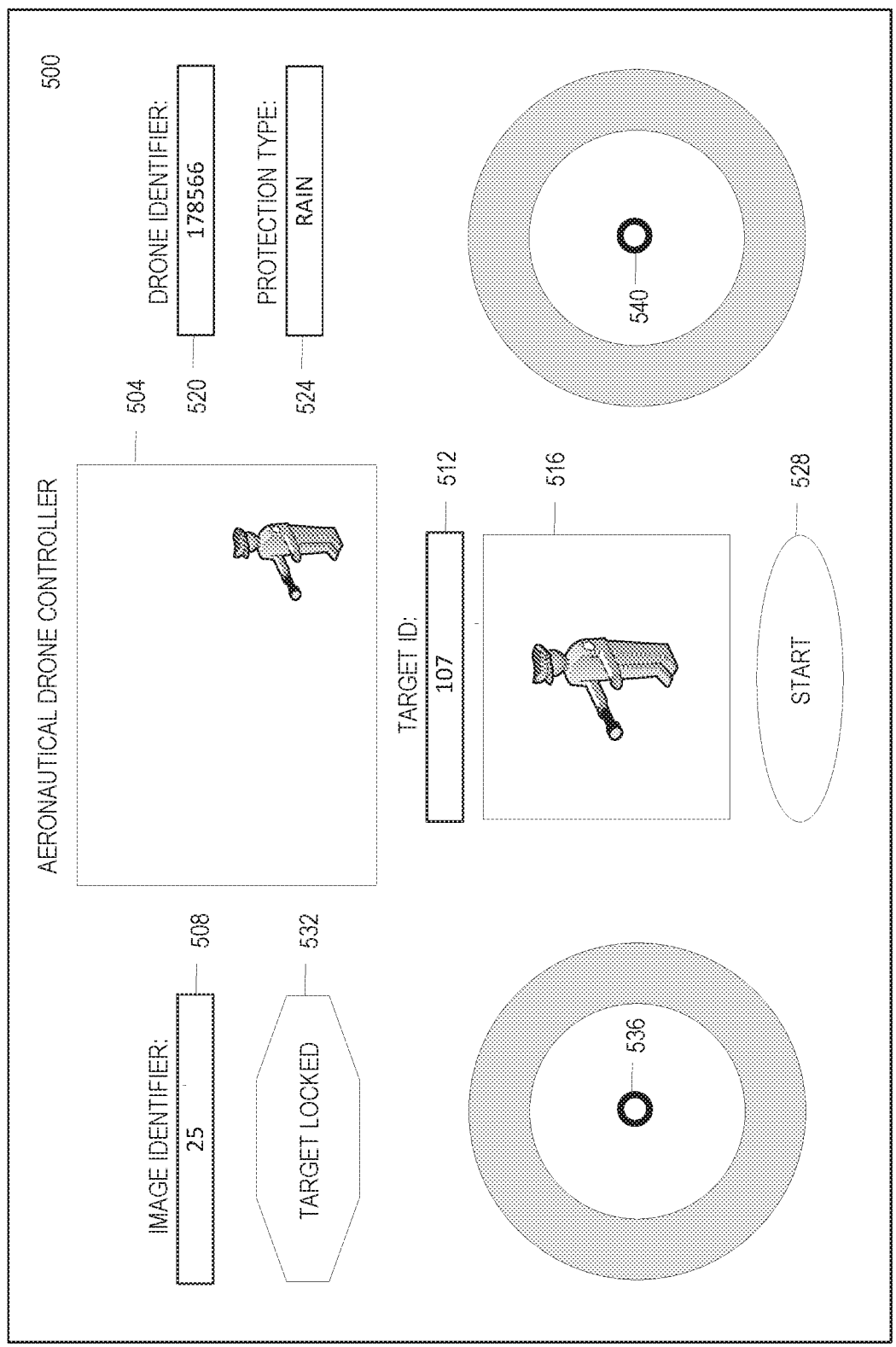
FIG. 5 illustrates an example user interface for configuring an intelligent protective drone system, in accordance with an example embodiment.

FIG. 5 illustrates an example user interface 500 for configuring the intelligent protective drone system 100, in accordance with an example embodiment. The user interface 500 may be generated by, for example, the user interface module 208.

As illustrated in FIG. 5, the user interface 500 comprises an image identifier field 508, a target identifier field 512, a target entity window 516, a drone identifier field 520, a protection type field 524, and a start button 528. A target entity icon 532 indicates when the tracking and guidance module 116 has locked onto the target entity. The drone identifier field 520 identifies the aeronautical drone 104 that is to be configured. (In environments with a plurality of aeronautical drones 104 operating in the same geographical area, the drone identifier field 520 identifies the aeronautical drone 104 that is to be configured via the user interface 500.) The target identifier field 512 is used to identify a target entity to be tracked by the aeronautical drone 104. For example, a user may select one of a plurality of candidate target entities from a library of target entities. An image of the selected target entity may be displayed in the target entity window 516. Similarly, the image identifier field 508 may be used to select an image of an object or other type of target entity that is to be tracked by the aeronautical drone 104. The selected image may be displayed in the target entity window 516. The protection type field 524 is used to identify the type of environmental element(s) (e.g., sun, rain, snow, and the like) that the environmental protective shield 108 is to provide protection from.

A video display 504 allows a user to view the image captured by the camera system 112 of the aeronautical drone 104. The aeronautical drone 104 may be controlled by the user to initially position the aeronautical drone 104 using joysticks 536, 540 such that the captured image includes the target entity that is to be tracked. The joystick 536 may be used to control the altitude of the aeronautical drone 104, and the joystick 540 may be used to control the latitude and longitude of the aeronautical drone 104. In one example embodiment, an object or individual displayed in the image of the video display 504 may be selected using a touch screen, and the selected object or individual may be set as the target entity. Once the aeronautical drone 104 is properly positioned and the target entity has been identified and locked onto by the tracking and guidance module 116, the start button 528 may be selected and the guidance module 228 may assume control of the aeronautical drone 104 and maintain the proper position of the aeronautical drone 104 in relation to the target entity. The guidance module 228 also activates the target entity icon 532 to indicate that the tracking and guidance module 116 has locked onto the target entity.

Figure 6:
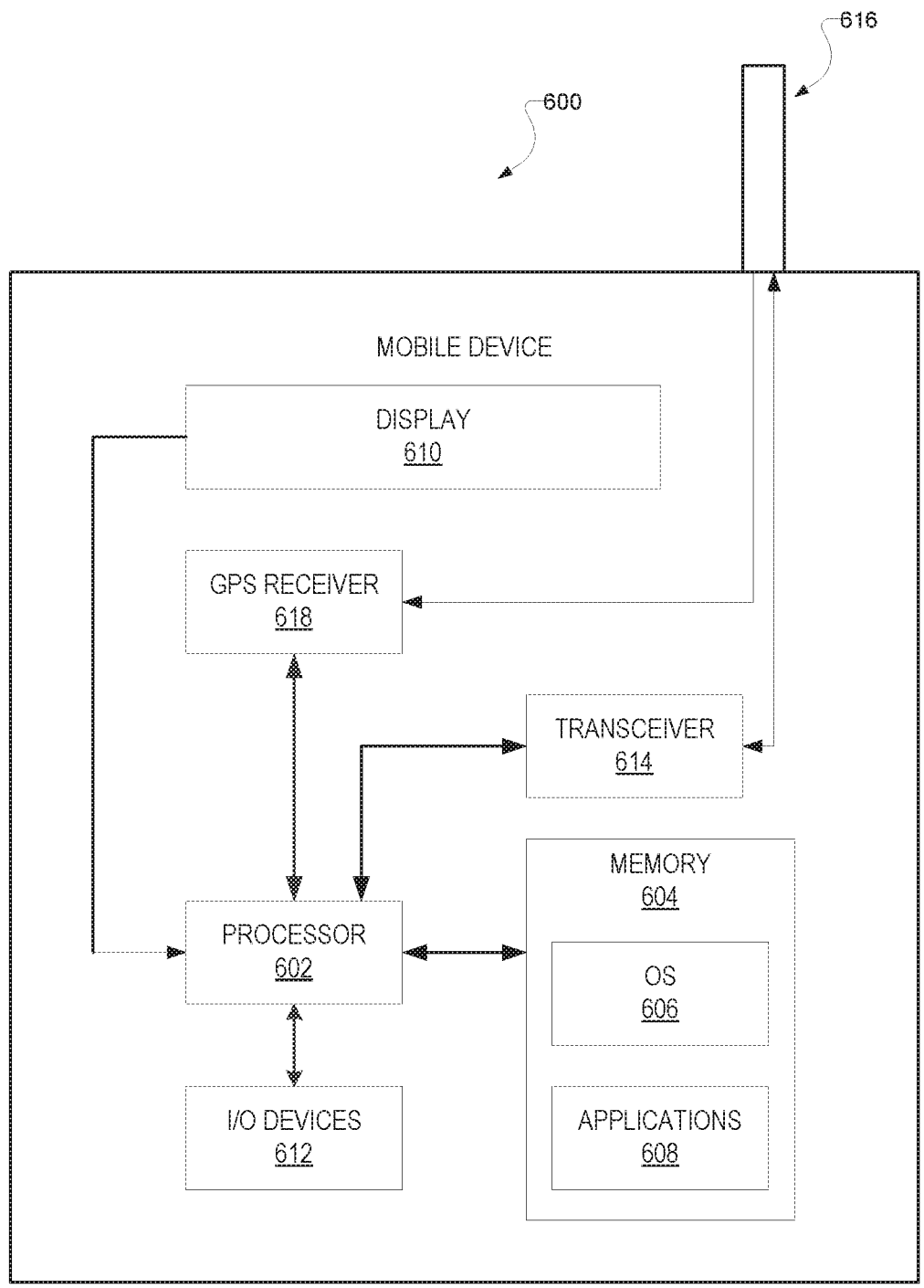
FIG. 6 is a block diagram illustrating an example mobile device, according to an example embodiment.

Although certain examples are shown and described here, other variations exist and are within the scope of the invention. It will be appreciated, by those of ordinary skill in the art, that any arrangement that is designed or arranged to achieve the same purpose may be substituted for the specific embodiments shown. This application is intended to cover any adaptations or variations of the example embodiments of the invention described herein. It is intended that this invention be limited only by the claims, and the full scope of equivalents thereof Example Mobile Device FIG. 6 is a block diagram illustrating an example mobile device 600, according to an example embodiment. The mobile device 600 may include a processor 602. The processor 602 may be any of a variety of different types of commercially available processors suitable for mobile devices (for example, an XScale architecture microprocessor, a microprocessor without interlocked pipeline stages (MIPS) architecture processor, or another type of processor 602). A memory 604, such as a random access memory (RAM), a flash memory, or another type of memory, is typically accessible to the processor 602. The memory 604 may be adapted to store an operating system (OS) 606, as well as application programs 608, such as a mobile location enabled application that may provide location-based services (LBSs) to a user. The processor 602 may be coupled, either directly or via appropriate intermediary hardware, to a display 610 and to one or more input/output (I/O) devices 612, such as a keypad, a touch panel sensor, a microphone, and the like. Similarly, in some embodiments, the processor 602 may be coupled to a transceiver 614 that interfaces with an antenna 616. The transceiver 614 may be configured to both transmit and receive cellular network signals, wireless data signals, or other types of signals via the antenna 616, depending on the nature of the mobile device 600. Further, in some configurations, a GPS receiver 618 may also make use of the antenna 616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field-programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 7:
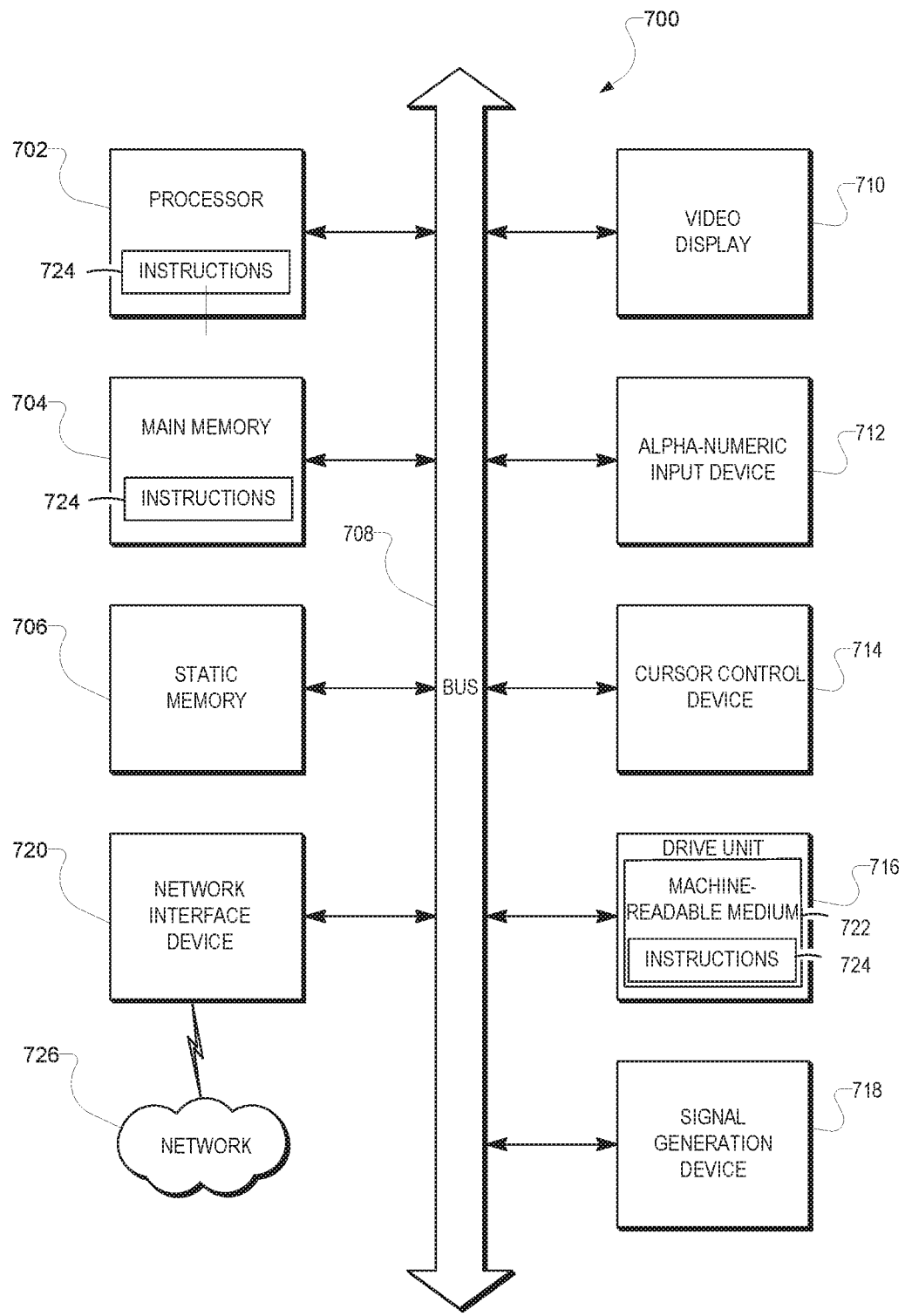
FIG. 7 is a block diagram of a machine within which instructions may be executed for causing the machine to perform any one or more of the methodologies discussed herein.

FIG. 7 is a block diagram of a machine in the example form of a computer system 700 within which instructions may be executed for causing the machine to perform any one or more of the methodologies discussed herein. In one example embodiment, the machine may be the example apparatus 200 of FIG. 2 for controlling the aeronautical drone 104. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a drive unit 716, a signal generation device 718 (e.g., a speaker), and a network interface device 720.

Machine-Readable Medium

The drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media 722. The instructions 724 may also reside within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more data structures or instructions 724. The term "machine-readable medium" shall also be taken to include any tangible medium that is capable of storing, encoding, or carrying the instructions 724 for execution by the machine and that cause the machine to perform any one or more of the methodologies of the present invention, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., hypertext transfer protocol (HTTP)). Examples of communications networks 726 include a local area network (LAN), a wide area network (WAN), the Internet, mobile telephone networks, plain old telephone service (POTS) networks, and wireless data networks (e.g., WiFi and WiMax networks). The term "transmission medium" shall be taken to include any intangible medium that is capable of storing, encoding, or carrying the instructions 724 for execution by the machine, and includes digital or analog communications signals or other intangible media to facilitate communication of such instructions 724.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, the apparatus comprising:
   an aeronautical drone comprising an environmental protective shield;
   a camera system configured to capture an image of an environment near the aeronautical drone;
   an image processing module configured to identify a target entity by processing the image captured by the camera system;
   a tracking and guidance module configured to track the target entity and determine a location for the aeronautical drone that creates an effective protective area of a specified size and location and positions the effective protective area around the target entity; and
   an effective protective area module configured to identify a geographical location of the effective protective area provided by the environmental protective shield in relation to the target entity.

2. The apparatus of claim 1, wherein the image processing module is further configured to process the image to identify the effective protective area.

3. The apparatus of claim 1, wherein the processing of the image identifies a person.

4. The apparatus of claim 1, wherein the processing of the image identifies a graphical symbol associated with the target entity.

5. The apparatus of claim 1, wherein the geographical location is defined by a position the environmental protective shield relative to the target entity.

6. The apparatus of claim 1, wherein the geographical location is defined by latitude and longitude coordinates.

7. The apparatus of claim 1, wherein the tracking and guidance module is further configured to incrementally adjust a transient location of the aeronautical drone toward placing the effective protective area around the target entity.

8. The apparatus of claim 1, wherein the environmental protective shield is configured to rotate, tilt, or both.

9. The apparatus of claim 8, wherein the tracking and guidance module is further configured to issue instructions for tilting, rotating, or both the environmental protective shield in order to locate the effective protective area at an effective location that positions the effective protective area around the target entity.

10. A method, the method comprising:
    capturing an image, using a camera system, of an environment near an aeronautical drone;
    processing the image to identify a target entity;
    identifying a geographical location, in relation to the target entity, of an effective protective area provided by an environmental protective shield; and
    determining a location for the aeronautical drone that implements the effective protective area based on a specified size and location and positions the effective protective area around the target entity.

11. The method of claim 10, further comprising processing the image to identify the effective protective area.

12. The method of claim 10, wherein the processing of the image identifies a person.

13. The method of claim 10, wherein the processing of the image identifies a graphical symbol associated with the target entity.

14. The method of claim 10, wherein the geographical location is defined by latitude and longitude coordinates.

15. The method of claim 10, wherein the location determined for the aeronautical drone is determined by incrementally adjusting the location of the aeronautical drone toward placing the effective protective area around the target entity.

16. The method of claim 10, further comprising issuing instructions for tilting, rotating, or both the environmental protective shield in order to locate the effective protective area at the location that positions the effective protective area around the target entity.

17. The method of claim 10, further comprising moving the aeronautical drone to the determined location.

18. The method of claim 10, further comprising obtaining Global Positioning Satellite (GPS) coordinates of the target entity to identify the location of the target entity.

19. The method of claim 10, further comprising tracking a radio beacon emitted by the target entity to identify the location of the target entity.

20. A non-transitory machine-readable storage medium comprising instructions, which when implemented by one or more machines, cause the one or more machines to perform operations comprising:

capturing an image, using a camera system, of an environment near an aeronautical drone;

processing the image to identify a target entity;

identifying a geographical location, in relation to the target entity, of an effective protective area provided by an environmental protective shield; and determining a location for the aeronautical drone that implements the effective protective area based on a specified size and location and positions the effective protective area around the target entity.

* * * * *